ELECTRICAL SENSING CIRCUIT
Filed May 15, 1958
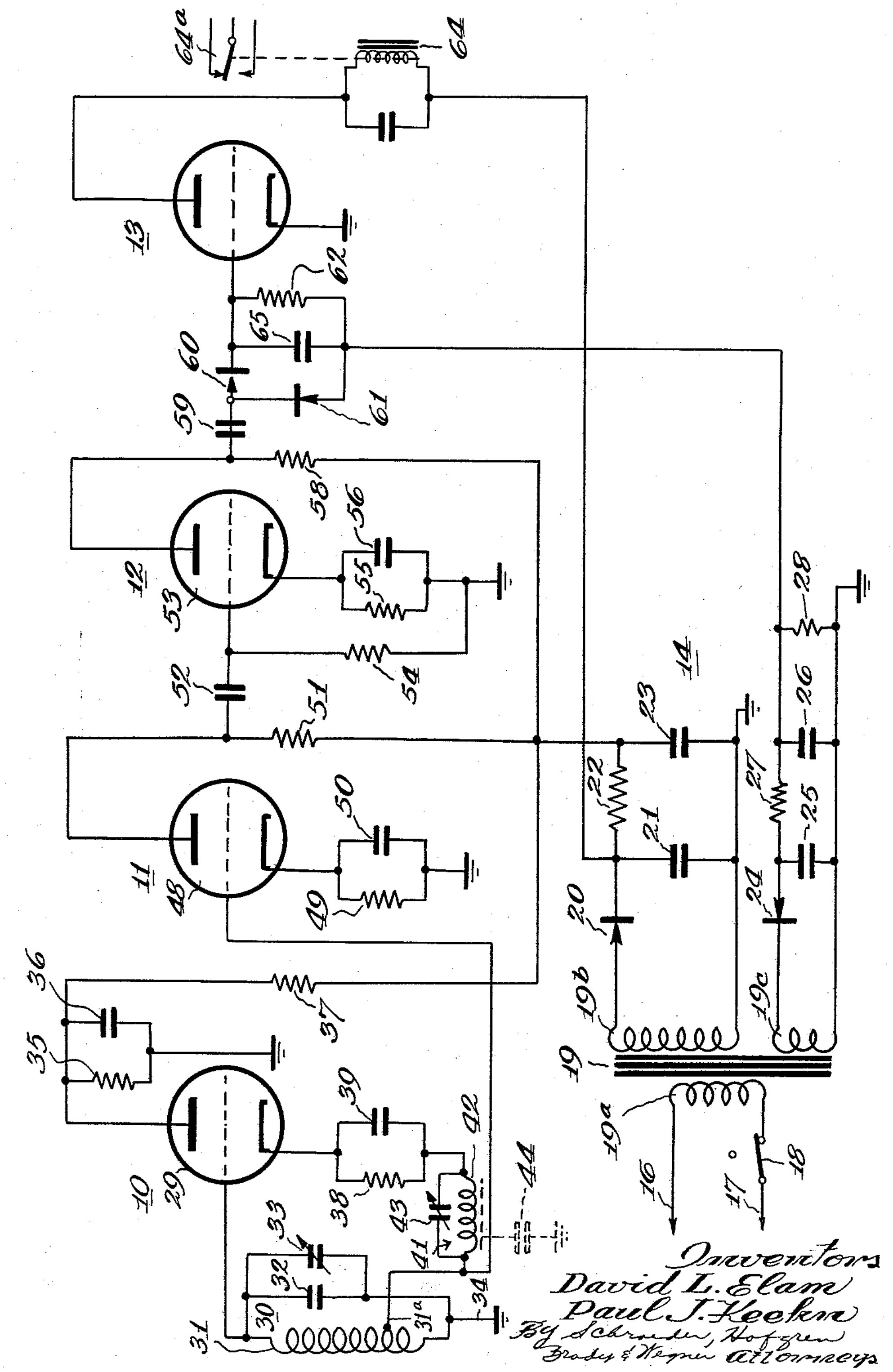
Inventors
David L. Elam
Paul J. Keehn
By Schroeder, Hofgren
Brady & Wegner Attorneys 3,015,077
Patented Dec. 26, 1961

3,015,077
ELECTRICAL SENSING CIRCUIT

David L. Elam, Roselle, and Paul J. Keehn, Chicago, Ill., assignors to Electro Products Laboratories, Inc., a corporation of Illinois Filed May 15, 1958, Ser. No. 735,624
5 Claims. (Cl. 331—65)

This invention relates to an electrical sensing circuit and more particularly to a novel oscillator circuit for sensing the presence or absence of a conductive object within a sensitive area adjacent a pickup element.

Copending Elam application, Serial No. 481,146, filed January 11, 1955, now Patent No. 2,883,538, discloses a sensing circuit utilizing an oscillator, the inductive portion of the tuned circuit of which forms a pickup coil. The presence of a conductive object in the field of the pickup loads the tuned circuit damping out the oscillations, providing an indication which may be utilized to actuate a counter or control circuits. The Q of the tuned circuit of the oscillator is relatively low, limiting the sensitivity which is attainable with the system.

A principal object of the present invention is the provision ofa novel oscillator circuit which is inoperative or in the non-oscillatory condition when a desired object is not in the sensitive area or field adjacent the pickup, and which goes into oscillation when a desired object enters the sensitive pickup area.

One feature of the invention is the provision of a sensing circuit including an oscillatory circuit element, and circuit means connected thereto for establishing an oscillatory condition, including a pickup circuit means having a sensitive area preventing oscillation in the oscillatory element in the absence of a desired object in the sensitive area, while permitting oscillation in the presence of a desired object in the sensitive area.

Another feature is that the pickup circuit means is connected in the feedback circuit for the oscillator. A further feature is that the pickup circuit has a high impedance in the absence of a desired object in the sensitive area thereof, and a low impedance in the presence of a desired object. Yet another feature is that a parallel tuned circuit is connected in the feedback circuit for the oscillator with the inductor portion thereof forming a pickup coil.

Further features and advantages will readily be apparent from the following specification and from the drawing which is a schematic diagram of an electrical sensing circuit embodying the invention.

The sensing circuit disclosed herein may be used in a variety of ways. As pointed out above, the oscillator itself is sensitive to the presence or absence of a conductive object in the field of the pickup coil, the oscillator operating in the presence of such an object and being rendered non-oscillatory in the absence thereof. The oscillations derived from the oscillator, when in an oscillatory condition, are amplified and utilized to control desired indicator circuits. For example the apparatus may be used as a counter to record the number of conductive objects passing the pickup, in which case the signals are used to actuate a mechanical counting device. The circuit may also be used as a limit switch to control the movement of machines, workpieces or the like, through the use of suitable automatic controls.

Referring now more particularly to the drawing, the embodiment of the invention shown therein includes an oscillator section 10, two stages of amplification 11 and 12 and a control tube 13. A power supply 14 provides operating potentials for the circuit.

In the following detailed description of the circuit, values will be assigned to the various circuit elements, and tube type designations applied to the various tubes. It is to be understood that this specific embodiment is described solely for the purpose of providing a complete disclosure of the invention, and many changes and substitutions will be apparent to those skilled in the art.

The power supply 14 is energized from a suitable source of electrical energy, as 110 volts A.C., through leads 16 and 17 and an "on-off" switch 18. The primary winding 19*a* of power transformer 19 is connected to the line. High voltage secondary winding 19*b* has connected thereto a half wave rectifier 20 and a filter including input capacitor 21, 20 $\mu$f. (microfarad), resistor 22, 5600 ohms, and capacitor 23, 10$\mu$f. A voltage of approximately 150 volts is available across capacitor 21, and a voltage of approximately 125 volts appears across capacitor 23. Secondary winding 19*c* is connected with rectifier 24 and a filter including capacitors 25 and 26, each 25$\mu$f, and resistor 27, 10,000 ohms, providing a negative bias supply of the order of 8½ volts. A bleeder resistor 28, 56,000 ohms, is shunted across the bias supply.

Oscillator 10 includes an amplifying element 29, here one-half of a 6SN7 dual triode, having cathode, control grid and plate electrodes. The triode 29 is connected in a Hartley oscillator circuit with a tuned tank circuit 30 including inductor 31 and capacitors 32 and 33 connected between the control grid and a reference potential or ground 34. The cathode is returned to a tap 31*a* on the inductor. Connected between the plate and ground is a parallel circuit including resistor 35, 15,000 ohms and capacitor 36, 0.02 $\mu$f., placing the plate at zero radio frequency potential. The plate is connected through resistor 37, 56,000 ohms, with the B+ supply. Cathode bias is provided by resistor 38, 2200 ohms, shunted by capacitor 39, 0.02 $\mu$f. Connected in the cathode circuit, between the bias resistor 38 and tap 31*a* of inductor 31 is a parallel tuned circuit 41 including inductor 42 shunted by adjustable capacitor 43 and stray or distributed capacity 44. The circuit 41 is adjusted to resonate at substantially the resonant frequency of the tank circuit 30 for the oscillator, inductor 31 and capacitors 32 and 33.

Inductor 42, which is essentially in the feedback network for the oscillator, forms the pickup for the sensing circuit. In most situations, this circuit element is located outside the chassis or housing for the remainder of the circuit, and is connected thereto by a length of cable, which accounts, at least in part, for the distributed capacity 44. The parallel tuned circuit 41 has an extremely high impedance at its resonant frequency, which is made the same as the resonant frequency of the tank circuit. Accordingly, the energy coupled from the plate circuit to the grid circuit of the tube at the resonant frequency is quite small, less than that required to sustain oscillation. Normally, i.e. without a conductive object near inductor 42, the oscillator does not operate. However, when a conductive object enters the sensitive area adjacent pickup coil 42, it acts as a shorted turn placed around the coil, reducing the inductance substantially. This reduction in the apparent inductance of pickup coil 42 detunes the circuit 41 from the frequency of tank circuit 30, lowering its impedance and permitting sufficient energy to be coupled through the feedback circuit from the plate circuit of triode 29 to the control grid circuit, sustaining oscillation in the tube. When the conductive object leaves the sensitive area or field adjacent pickup coil 42, the circuit 41 again appears as a high impedance at the oscillator frequency reducing the energy coupled through the feedback circuit to a level insufficient to sustain oscillation.

The oscillator may be designed to operate over a wide range, from at least 50 kilocycles to a frequency in excess of one megacycle. In one specific embodiment, the oscillator operates at a frequency of 400 kilocycles, inductor 31 is 400 microhenries and the combination of capacitors 32, 33 and distributed capacity is of the order of 400 $\mu\mu$f. The pickup coil may have slightly less inductance, as variable capacitor 43 has a maximum value of 950 $\mu\mu$f, which, together with the distributed capacity 44, is somewhat greated than the capacity in the tank circuit.

An output signal from the oscillator 10 is obtained at the cathode tap 31*a* of inductor 31 and is directly coupled to the control grid of tube 48, one-half of a 6SN7, forming amplifier 11. Bias for tube 48 is provided by resistor 49, 1000 ohms, shunted by capacitor 50, 0.02 $\mu$f., connected between the cathode and ground. The plate is connected through load resistor 51, 56,000 ohms, to the B+ supply. The output of amplifier 11 is coupled through capacitor 52, 0.001 $\mu$f., to the control grid of triode 53, one-half of a 6SN7, forming amplifier 12. The control grid is returned to ground through resistor 54, 100,000 ohms, and bias is provided by resistor 55, 1000 ohms, shunted by capacitor 56, 0.08 $\mu$f., in the cathode circuit. The output of the second stage of amplification is developed across resistor 58 in the plate circuit. The output from amplifier 12 is coupled through capacitor 59, 0.001 $\mu$f., to a rectifier including diodes 60 and 61.

With no signal coming from the oscillator 10, output tube 13 is maintained at or near cutoff by the negative bias applied through resistor 62, 56,000 ohms, to the control grid. In this situation, the control relay 64, connected in the plate circuit of the output tube is not energized. When, however, the oscillator begins to operate (with a conductive object in the field of pickup coil 42) the amplified signal appearing in the output of amplifier 12 is rectified and a positive voltage is established at the control grid of output tube 13, and across capacitor 65, overcoming the negative bias and rendering the output tube conductive, to energize relay 64 and cause a change in the connections of contacts 64*a* associated therewith. Suitable circuits may be connected to contacts 64*a* for actuating desired indicator mechanisms, as a counter, further relays, or the like. When the conductive object leaves the field of pickup 42, oscillation ceases, the charge on capacitor 65 is dissipated in resistor 62, the bias applied to the control grid of the output tube again cuts it off.

The sensitivity of the circuit depends upon the variation in the impedance of parallel resonant circuit 41 with a detuning of the circuit by the presence of a conductive object in the sensitive area adjacent thereto, and this sensitivity may be made quite large by proper design of the coil and resonant circuit. Sensitivities of at least twice that of the sensing circuit disclosed in the aforementioned copending Elam application have been attained with the circuit described above.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A sensing circuit, comprising: an amplifying tube having at least cathode, plate and control grid electrodes; a first parallel tuned circuit connected to the electrodes of said tube for establishing an oscillatory condition therein and including an inductor having one terminal connected to said control grid, a tap connected with said cathode and another terminal connected with said plate; and a second parallel tuned circuit connected between said tap and said cathode, and including an inductor having a sensitive area adjacent thereto, said second parallel tuned circuit presenting a high impedance at the frequency of said first parallel tuned circuit in the absence of a conductive object in said area, preventing the feedback of sufficient energy to sustain oscillation in said tube and presenting a low impedance at the frequency of said first parallel tuned circuit in the presence of a conductive object in said area, permitting the feedback of sufficient energy to sustain oscillation in said tube.

2. A sensing circuit as described in claim 1, wherein an output signal is derived from the tap of said inductor.

3. A sensing circuit of the character described, comprising: an amplifying circuit device having input and output elements; a first tuned circuit, including parallel connected inductor and capacitor elements connected with the input element of said device; a feedback circuit between said output element and an intermediate point of said inductor of said first tuned circuit, establishing oscillation in said device at a desired frequency; and a second tuned circuit including an inductor and a capacitor, connected in said feedback circuit, said second tuned circuit being resonant at said desired frequency, preventing coupling of energy through said feedback circuit to said input element, the inductor of said second tuned circuit having a sensitive area adjacent thereto and the inductance of said inductor being a function of the proximity of a conductive object in said area, said second tuned circuit being tuned to a frequency substantially different from said desired frequency in the presence of such object, permitting the coupling of sufficient energy through said feedback circuit to sustain oscillation.

4. A sensing circuit, comprising: an amplifying device having input and output elements; a first parallel tuned circuit connected to the elements of said device for establishing an oscillatory condition therein and including an inductor having one terminal connected with said input element and another terminal connected with said output element; a feedback circuit connected to a tap on said inductor; and a second parallel tuned circuit connected in said feedback circuit and including an inductor having a sensitive area adjacent thereto, said second parallel tuned circuit presenting a high impedance at the frequency of said first parallel tuned circuit in the absence of a conductive object in said area, preventing the feedback of sufficient energy to sustain oscillation in said device and presenting a low impedance at the frequency of said first parallel tuned circuit in the presence of a conductive object in said area, permitting the feedback of sufficient energy to sustain oscillation in said device.

5. A sensing circuit, comprising: an amplifying tube having at least cathode, plate and control grid electrodes; a first parallel tuned circuit connected to the electrodes of said tube for establishing an oscillatory condition therein and including an inductor having one terminal connected to said control grid, a tap connected with said cathode and another terminal connected with said plate; and a second tuned circuit connected with the connection between said tap and cathode, and including an inductor having a sensitive area adjacent thereto, said second tuned circuit being resonant at the frequency of said first tuned circuit in the absence of a conductive object in said area, preventing the feedback of sufficient energy to sustain oscillation in said tube and being detuned in the presence of a conductive object in said area, permitting the feedback of sufficient energy to sustain oscillation in said tube.

References Cited in the file of this patent

UNITED STATES PATENTS

| | | |
|---|---|---|
| 1,573,282 | Stone | Feb. 16, 1926 |
| 2,234,895 | Cerveny et al. | Mar. 11, 1941 |
| 2,386,942 | Edlman | Oct. 16, 1945 |
| 2,511,107 | Greeley | June 13, 1950 |
| 2,550,607 | Shoemaker | Apr. 24, 1951 |
| 2,584,728 | Michel | Feb. 5, 1952 |

FOREIGN PATENTS

| | | |
|---|---|---|
| 353,627 | Great Britain | July 30, 1931 |

OTHER REFERENCES

Journal of Scientific Instruments, vol. 21, June 1944, pages 108, 109, "An Electronic Indicator for Liquid Separation," Broadhurst.